United States Patent
Hong et al.

(10) Patent No.: US 11,711,001 B2
(45) Date of Patent: Jul. 25, 2023

(54) MOTOR APPARATUS

(71) Applicants: Hyundai Motor Company, Seoul (KR); Kia Corporation, Seoul (KR)

(72) Inventors: Hyun Seok Hong, Seoul (KR); Sang Hyun Jung, Hwaseong-si (KR); Hee Kwang Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 75 days.

(21) Appl. No.: 17/388,647

(22) Filed: Jul. 29, 2021

(65) Prior Publication Data

US 2022/0200419 A1 Jun. 23, 2022

(30) Foreign Application Priority Data

Dec. 21, 2020 (KR) ........................ 10-2020-0179538

(51) Int. Cl.
| | | |
|---|---|---|
| *H02K 15/02* | (2006.01) | |
| *H02K 16/00* | (2006.01) | |
| *B64C 27/10* | (2023.01) | |
| *H02K 3/32* | (2006.01) | |
| *H02K 1/06* | (2006.01) | |

(52) U.S. Cl.
CPC ............. *H02K 15/024* (2013.01); *H02K 1/06* (2013.01); *H02K 3/32* (2013.01)

(58) Field of Classification Search
CPC .. H02K 16/00; H02K 16/005; H02K 2201/12; H02K 3/32; B64C 27/08; B64C 27/10; B64C 2201/042
USPC .......................................... 310/112, 114, 145
See application file for complete search history.

(56) References Cited

U.S. PATENT DOCUMENTS

| | | | | |
|---|---|---|---|---|
| 1,871,446 A * | 8/1932 | Decker | ................... | H02K 33/18 310/27 |
| 3,497,730 A * | 2/1970 | Doolittle | ................ | H02K 17/12 310/216.127 |
| 3,746,899 A * | 7/1973 | Eastham | .............. | H02K 41/025 104/294 |
| 4,793,263 A * | 12/1988 | Basic | ...................... | B61B 13/08 104/282 |
| 6,169,349 B1 * | 1/2001 | Davenport | ............. | H02K 19/10 310/68 R |
| 6,236,138 B1 * | 5/2001 | Dunn | ...................... | H02K 23/30 310/179 |
| 6,376,955 B1 * | 4/2002 | Arimitsu | ................ | H02K 16/00 310/266 |
| 7,679,256 B2 * | 3/2010 | Tatematsu | ................ | H02K 3/28 310/216.109 |
| 2022/0185452 A1 * | 6/2022 | Saber | .................... | B64C 11/001 |

FOREIGN PATENT DOCUMENTS

| | | | | |
|---|---|---|---|---|
| EP | 3883096 A1 * | 9/2021 | ............... | H02K 3/18 |
| KR | 10-1859528 B1 | 5/2018 | | |
| KR | 10-2041781 B1 | 11/2019 | | |
| KR | 10-2020-0131767 A | 11/2020 | | |
| WO | WO-2020207862 A1 * | 10/2020 | ........... | B64C 11/001 |

* cited by examiner

*Primary Examiner* — Burton S Mullins
(74) *Attorney, Agent, or Firm* — Morgan, Lewis & Bockius LLP (57) ABSTRACT

A is constructed such that upper and lower shafts, which are coaxial, are rotated in opposite directions using a single coil winding, simplifying the structure of the motor apparatus and reducing the numbers of sensors and controllers to be mounted thereon.

11 Claims, 6 Drawing Sheets

MOTOR APPARATUS

CROSS-REFERENCE TO RELATED APPLICATION

The present application claims priority to Korean Patent Application No. 10-2020-0179538, filed on Dec. 21, 2020, the entire contents of which is incorporated herein for all purposes by this reference.

BACKGROUND OF THE INVENTION

Field of the Invention

The present invention relates to a motor apparatus in which a pair of motor assemblies are concurrently rotated in opposite directions using a single coil winding.

Description of Related Art

A motor is a power-generating element, which is very universally used in modern science and industry. In recent years, flight technology employing actuation of a motor using electrical energy has also been applied to the field of air mobility.

A flying vehicle, such as an air mobility or a drone, configured for realizing vertical takeoff and landing requires coaxial propellers, which are vertically spaced from each other and are rotated in opposite directions for efficient creation of thrust force.

For this reason, a conventional flying vehicle may be constructed to include upper and lower propellers, upper and lower motors and upper and lower controllers. However, because the sizes of the components required for the conventional coaxial propellers are increased, this has an adverse influence on air mobility.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a motor apparatus in which upper and lower shafts, which are coaxial, are rotated in opposite directions using a single coil winding, simplifying the structure of the motor apparatus and reducing the numbers of sensors and controllers to be mounted thereon.

In accordance with various aspects of the present invention, the above and other objects may be accomplished by the provision of a motor apparatus including an upper motor assembly including an upper stator and an upper rotor, and a lower motor assembly including a lower stator and a lower rotor, the lower motor assembly being disposed symmetrically with the upper motor assembly in an axial direction of the upper motor thereof, wherein the upper stator of the upper motor assembly and the lower stator of the lower motor assembly share a single coil, and wherein the coil is wound to be twisted at a boundary between the upper motor assembly and the lower motor assembly such that current in an upper portion of the coil in the upper motor assembly flows in a direction opposite to a direction in which current in a lower portion of the coil in the lower motor assembly flows, whereby the upper rotor of the upper motor assembly and the lower rotor of the lower motor assembly are rotated in opposite directions to each other.

The upper motor assembly may include the upper stator, around which the coil is wound, the upper rotor, disposed outside the upper stator, and an upper housing which surrounds the upper stator and is coupled to the upper rotor and to which an upper shaft is coupled, and the lower motor assembly may include the lower stator, around which the coil is wound, the lower rotor, disposed outside the lower stator, and a lower housing which surrounds the lower stator and is coupled to the lower rotor and to which a lower shaft is coupled.

Slots may be formed in the upper stator and the lower stator to be circumferentially disposed such that the coil is wound along the slots in the upper stator and the lower stator to be twisted.

The upper housing and the lower housing may be rotatably connected to each other via a bearing portion.

The coil may include an upper portion, which includes a plurality of first slope portions which intersects each other and then extends therefrom, and a first connection portion connecting upper end portions of the first slope portions to each other, and a lower portion, which includes a plurality of second slope portions which is respectively connected to lower end portions of the first slope portions and which intersects each other and then extend therefrom, and a second connection portion, which connects lower end portions of the second slope portions to each other.

The first slope portions and the second slope portions of the coil may extend in opposite directions.

The first slope portions and the second slope portions of the coil may be spaced from each other to prevent contact with therebetween.

Slots may formed in the upper stator of the upper motor assembly and in the lower stator of the lower motor assembly, and each of the slots formed in the upper stator and the lower stator of the upper and lower motor assemblies may be configured such that a width thereof continuously decreases toward the boundary between the upper motor assembly and the lower motor assembly.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a motor apparatus according to various exemplary embodiments of the present invention will be described with reference to the accompanying drawings.

Figure 1:
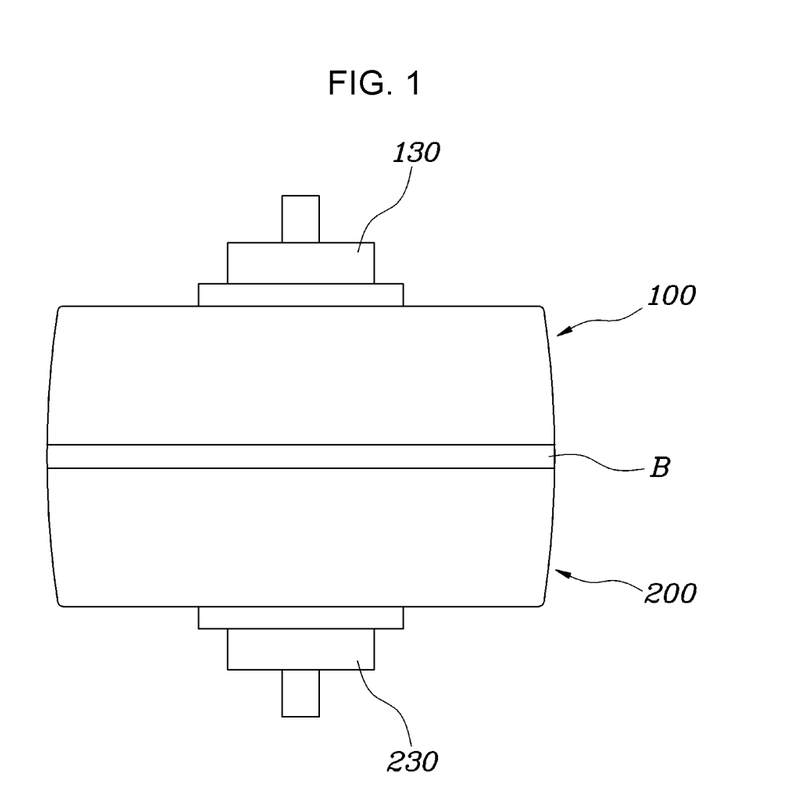
FIG. 1 is a view exemplarily illustrating a motor apparatus according to various exemplary embodiments of the present invention.
Figure 2:
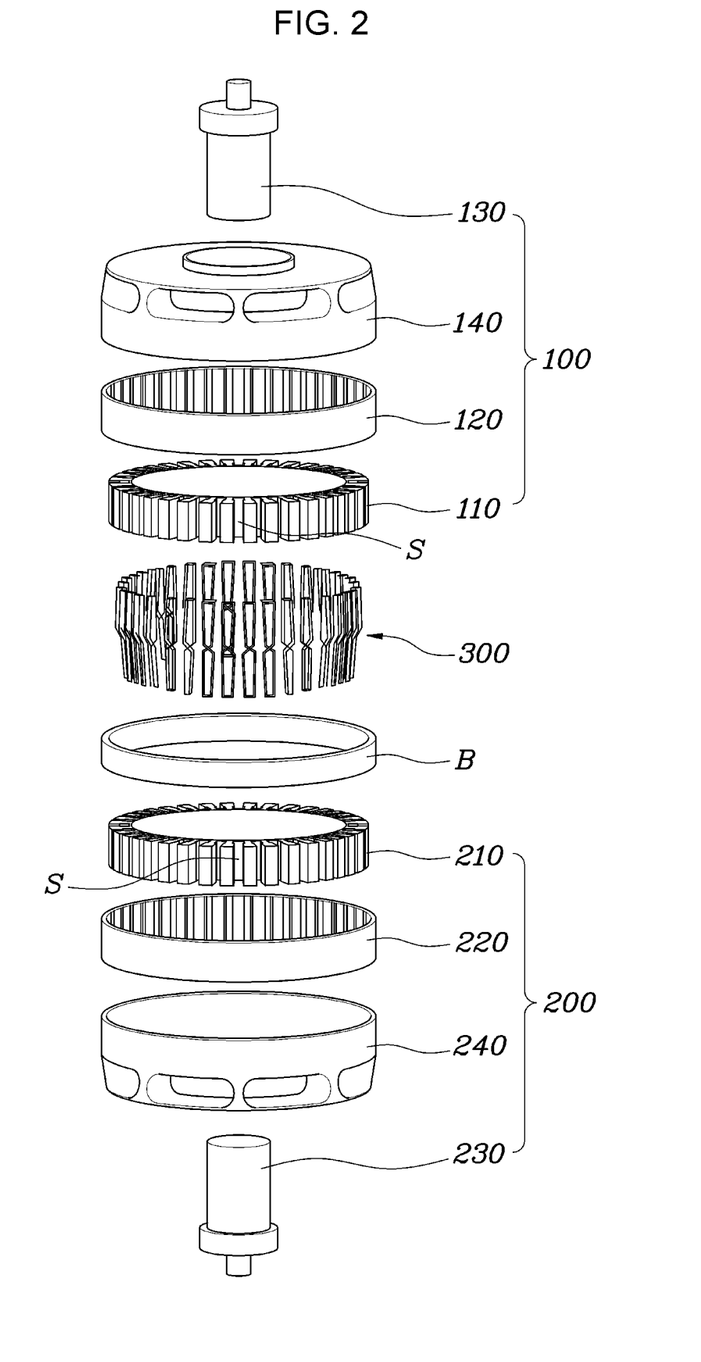
FIG. 2 is an exploded perspective view exemplarily illustrating the motor apparatus shown in FIG. 1.
Figure 3:
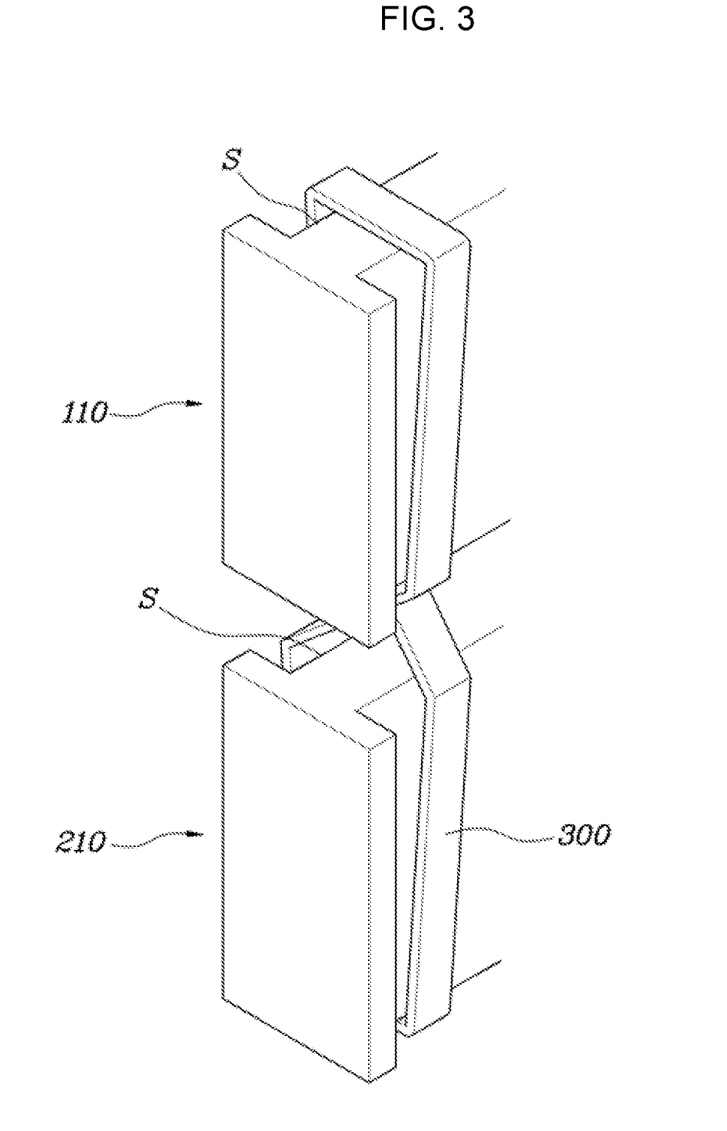
FIG. 3 and FIG. 4 are views explaining a coil of the motor apparatus according to the exemplary embodiment of the present invention.
Figure 4:
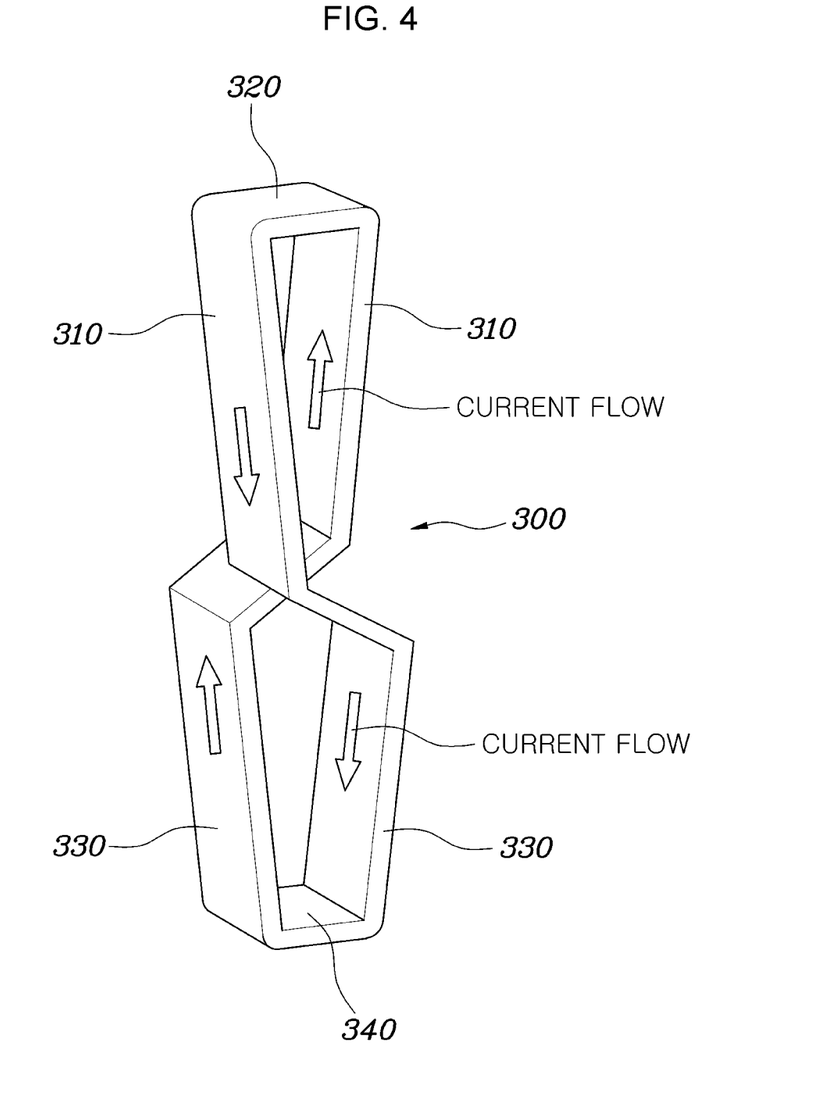
Figure 5:
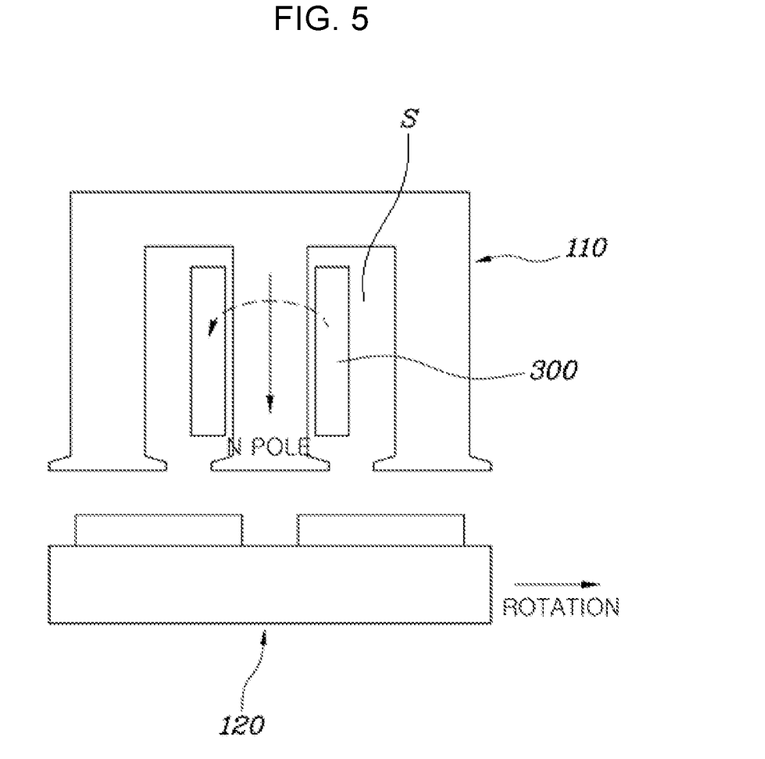
FIG. 5 and FIG. 6 are views explaining the operation of the motor apparatus according to the exemplary embodiment of the present invention.
Figure 6:
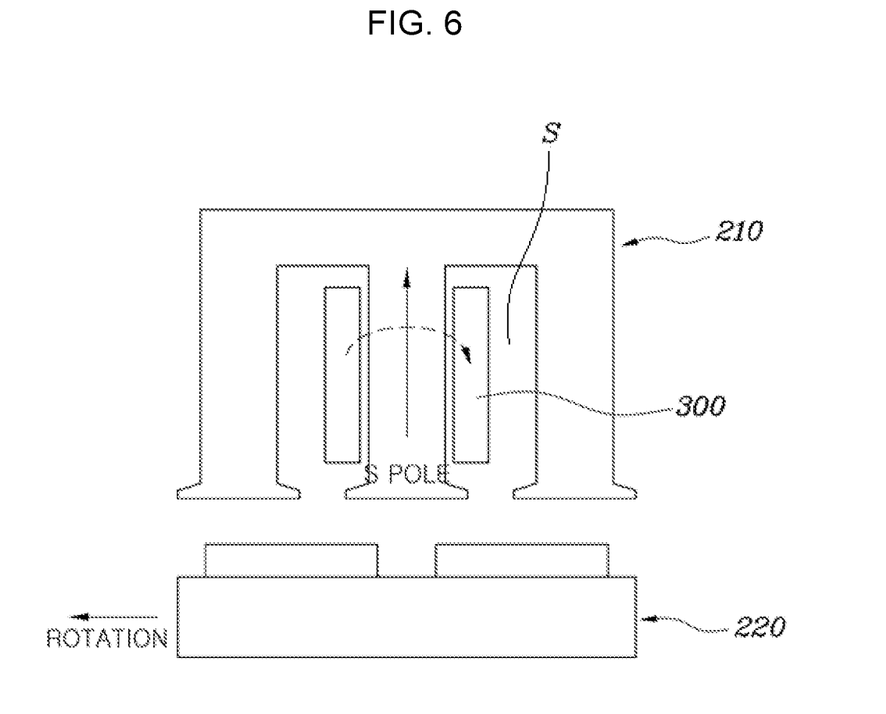

FIG. 1 is a view exemplarily illustrating the motor apparatus according to various exemplary embodiments of the present invention. FIG. 2 is an exploded perspective view exemplarily illustrating the motor apparatus shown in FIG. 1. FIG. 3 and FIG. 4 are views explaining a coil of the motor apparatus according to the exemplary embodiment of the present invention. FIG. 5 and FIG. 6 are views explaining the operation of the motor apparatus according to the exemplary embodiment of the present invention.

As illustrated in FIG. 1 and FIG. 2, the motor apparatus according to the exemplary embodiment of the present invention is constructed such that an upper motor assembly 100 and a lower motor assembly 200, each of which includes a stator and a rotor, are vertically disposed in a symmetrical state and such that the stator of the upper motor assembly 100 and the stator of the lower motor assembly 200 share a single coil 300.

In the present way, the motor apparatus according to the exemplary embodiment of the present invention includes the upper motor assembly 100 and the lower motor assembly 200, each of which includes the stator and the rotor such that the upper motor assembly 100 and the lower motor assembly 200 are operated independently of each other. Here, the upper motor assembly 100 and the lower motor assembly 200 are disposed symmetrically with each other, and the rotor of the upper motor assembly 100 and the rotor of the lower motor assembly 200 are rotated in different directions.

The stator of the upper motor assembly 100 and the stator of the lower motor assembly 200 share a single coil 300. In other words, since a single coil 300 is wound around both the upper motor assembly 100 and the lower motor assembly 200, the upper motor assembly 100 and the lower motor assembly 200 may be concurrently operated by the flow of the current generated by the single coil 300.

The coil 300 is twisted at the boundary between the upper motor assembly 100 and the lower motor assembly 200 such that the direction of current flowing in the coil portion of the upper motor assembly 100 and the direction of current flowing in the coil portion of the lower motor assembly 200 are opposite each other, rotating the rotor of the upper motor assembly 100 and the rotor of the lower motor assembly 200 in opposite directions.

In the present way, the coil 300 is wound around both the stator of the upper motor assembly 100 and the stator of the lower motor assembly 200 such that the coil 300 is twisted at the boundary between the upper motor assembly 100 and the lower motor assembly 200 to define an "8" shape. Hence, the coil 300 causes the direction of current flowing in the coil portion of the upper motor assembly 100 and the direction of current flowing in the coil portion of the lower motor assembly 200 to be opposite each other. Accordingly, because the upper motor assembly 100 and the lower motor assembly 200 are connected to a single coil 300, they are concurrently operated. Furthermore, because the directions of current flowing in the coil portions 300 are opposite each other, the stators of the upper and lower motor assemblies 100 and 200 are rotated in opposite directions to each other.

As described above, in the motor apparatus according to the exemplary embodiment of the present invention, the upper motor assembly 100 and the lower motor assembly 200 are constructed independently of each other and are connected to a single coil 300 such that the coil 300 is twisted at the boundary between the upper and lower motor assemblies 100 and 200 and thus the direction in which current flows in the coil portion of the upper motor assembly 100 and the direction in which current flows in the coil portion of the lower motor assembly 200 are opposite each other. Consequently, the rotor of the upper motor assembly 100 and the rotor of the lower motor assembly 200 are concurrently rotated in opposite directions. Since the motor assemblies of the motor apparatus according to the exemplary embodiment of the present invention are rotated in opposite directions, the motor apparatus is configured for efficiently generating thrust force when vertical takeoff and landing is performed, as in an air mobility or a drone.

The motor apparatus according to the exemplary embodiment of the present invention will now be described in more detail. As illustrated in FIG. 2, the upper motor assembly 100 includes an upper stator 110 around which the coil 300 is wound, an upper rotor 120 disposed outside the upper stator 110, and an upper housing 140, which surrounds the upper stator 110 and the upper rotor 120 and to which an upper shaft 130 is coupled. Meanwhile, the lower motor assembly 200 includes a lower stator 210 around which the coil 300 is wound, a lower rotor 220 disposed outside the lower stator 210, and a lower housing 240, which surrounds the lower stator 210 and the lower rotor 220 and to which a lower shaft 230 is coupled.

Here, the upper stator 110 and the lower stator 210 may be integrally formed, and slots S in the upper stator 110 and slots S in the lower stator 210, in which the coil 300 is received, may be aligned with each other. The coil 300 is wound around the upper stator 110 and the lower stator 210 to be twisted therebetween.

The upper housing 140 is coupled to the upper rotor 120 of the upper motor assembly 100. Accordingly, when current flows through the coil 300, the upper rotor 120 is rotated with respect to the upper stator 110, and thus the upper housing 140 is also rotated with the upper rotor 120. As a result, the upper shaft 130 coupled to the upper housing 140 is rotated, rotating a propeller mounted on the upper shaft 130.

Meanwhile, the lower housing 240 is coupled to the lower rotor 220 of the lower motor assembly 200. Accordingly, when current flows through the coil 300, the lower rotor 220 is rotated with respect to the lower stator 210, and thus the lower housing 240 is also rotated with the lower rotor 220. Here, because the current flowing in the coil portion wound around the lower stator 210 and the current flowing in the coil portion wound around the upper stator 110 are directed in opposite directions, the lower rotor 220 is rotated in a direction opposite to the rotation direction of the upper rotor 120. Consequently, the lower shaft 230 coupled to the lower housing 240 is rotated opposite to the rotation direction of the upper shaft 130, rotating the propeller mounted on the lower shaft 230 in the opposite direction thereof.

The slots S may be formed both in the upper stator 110 and in the lower stator 210 to be disposed in a circumferential direction thereof, and the coil 300 may be wound along the slots in the upper stator 110 and the slots S in the lower stator 210 while being twisted. The slots S in the upper stator 110 and the slots S in the lower stator 210 may be formed to be aligned with each other. As a result, the coil 300 may be wound along the slots S in the upper stator 110 and the slots S in the lower stator 210 while being twisted. Because the coil 300 is wound along the slots S in the upper stator 110 and the slots S in the lower stator 210 while being twisted, the slots S in the upper stator and the lower stator 110 and 210 are configured to accommodate the thickness of the coil 200.

As illustrated in FIG. 3, because the coil 300 is wound along the slots S in the upper stator 110 and the slots S in the lower stator 210 while being twisted, the coil 300 has an "8" shape. Hence, because the current flowing in the coil portion wound around the upper stator 110 and the current flowing in the coil portion wound around the lower stator 210 are directed in opposite directions, the upper rotor 120, which is associated with the upper stator 110 and the lower rotor 220, which is associated with the lower stator 210, are rotated in opposite directions to each other.

The upper shaft 130 and the lower shaft 230 may be coaxially disposed, and the upper rotor 120 and the upper housing 140 may be respectively configured to have the same shapes as those of the lower rotor 220 and the lower housing 240.

The upper housing 140 and the lower housing 240 may be rotatably connected to each other via a bearing portion B such that permits relative rotation therebetween. The bearing portion B may connect the upper housing 140 to the lower housing 240 such that the upper housing 140 is rotated relative to the lower housing 240 in a rolling or slipping manner. Since the upper housing 140 and the lower housing 240 are connected to each other via the bearing portion B, packaging thereof is facilitated, and the upper housing 140 and the lower housing 240 are easily rotated in opposite directions.

The coil 300 will now be described. As illustrated in FIG. 4, the coil 300 may include an upper portion, which includes a plurality of first slope portions 310, which intersect each other and then extend therefrom, and a first connection portion 320, connecting the upper end portions of the first slope portions 310 to each other, and a lower portion, which includes a plurality of second slope portions 330, which are respectively connected to the lower end portions of the first slope portions 310 and which intersect each other and then extend therefrom, and a second connection portion 340, connecting the lower end portions of the second slope portions 330 to each other.

In the present way, the upper portion of the coil 300 includes the first slope portions 310 and the first connection portion 320, the lower portion of the coil 300 includes the second slope portions 330 and the second connection portion 340. because a pair of first slope portions 310 intersect each other and then extend therefrom and a pair of second slope portions 330, which are connected to the pair of first slope portions 310, also intersect each other and then extend therefrom, the coil 300 has a twisted shape. Here, the pair of first slope portions 310 are connected to each other via the first connection portion 320, and the pair of second slope portions 330 are connected to each other via the second connection portion 340.

To this end, each of the slots S formed in the stators of the upper and lower motor assemblies 100 and 200 may be configured such that the width thereof continuously decreases toward the boundary between the upper motor assembly 100 and the lower motor assembly 200. Accordingly, when the coil 300 is wound in the slots S in the upper and lower motor assemblies 100 and 200, the first slope portions 310 and the second slope portions 330 may obliquely extend along the slots S. Consequently, when the coil 300 is wound around the stators of the upper and lower motor assemblies 100 and 200, the coil 300 may be smoothly twisted at the boundary between the upper motor assembly 100 and the lower motor assembly 200, and the increase in the thickness of the coil 300 due to winding of the coil 300 may be reduced.

Extension lines may extend from the first connection portion 320 or the second connection portion 340 to be wound around the stators of the upper and lower motor assemblies 100 and 200 in a circumferential direction thereof. When the motor apparatus is embodied by a three-phase motor, wires corresponding to U, V and W phases may be wound around respective stators of the upper and lower motor assemblies 100 and 200. Hence, the coil 300 may include a plurality of wires, which are wound around the stators of the upper motor assembly 100 and the stators of the lower motor assembly 200, and the direction in which the coil 300 extends may be inverted at each of the slots S in the stators.

Consequently, the first slope portions 310 and the second slope portions 330, which are connected to each other, may extend in opposite directions. Because the coil 300 is twisted at the boundary between the upper motor assembly 100 and the lower motor assembly 200, the distance between the pair of first slope portions 310 and the distance between the pair of second slope portions 330 gradually decrease toward the boundary between the upper motor assembly 100 and the lower motor assembly 200. The sloping direction of the first slope portions 310 and the sloping direction of the second slope portions 330 are inverted at the twisted position. Consequently, the coil 300 is twisted to have an "8" shape, and the current in the upper motor assembly 100 and the current in the lower motor assembly 200 may flow in opposite directions.

The first slope portions 310 and the second slope portions 330 of the coil 300 may extend in the state of being spaced from each other. Since the first slope portions 310 and the second slope portions 330 are not in contact with each other when the coil 300 is wound around the stators of the upper and lower motor assemblies 100 and 200, there is no risk of an electric short.

Hereinafter, flow of current in the coil 300 according to the exemplary embodiment of the present invention will be described.

FIG. 5 is a view exemplarily illustrating the coil 300 of the upper motor assembly 100. FIG. 6 is a view exemplarily illustrating the coil 300 of the lower motor assembly 200.

Referring to FIG. 4, because the coil 300 is twisted to have an "8" shape, the current in the upper portion of the coil 300 flows counterclockwise, and the current in the lower portion of the coil 300 flows clockwise.

Accordingly, as illustrated in FIG. 5, because the current in the coil 300 of the upper motor assembly 100 flows counterclockwise, the rotor 120 is rotated to the right.

Meanwhile, as illustrated in FIG. 6, because the current in the coil 300 of the lower motor assembly 200 flows clockwise, the rotor 220 is rotated to the left.

As described above, the motor apparatus according to the exemplary embodiment of the present invention is constructed such that the upper motor assembly 100 including the stator and the rotor and the lower motor assembly 200 including the stator and the rotor are symmetrically disposed while sharing the single coil 300, and the coil 300 is wound so to be twisted. Consequently, the rotor of the upper motor assembly 100 and the rotor of the lower motor assembly 200 are concurrently rotated in opposite directions.

As is apparent from the above description, various aspects of the present invention are directed to providing a motor apparatus in which upper and lower shafts, which are coaxial, are rotated in opposite directions using a single coil winding, simplifying the structure of the motor apparatus and reducing the numbers of sensors and controllers to be mounted thereon.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A motor apparatus comprising:
    an upper motor assembly including an upper stator and an upper rotor rotatably coupled to the upper stator; and
    a lower motor assembly including a lower stator and a lower rotor rotatably coupled to the lower stator,
    wherein the upper stator of the upper motor assembly and the lower stator of the lower motor assembly share a single coil,
    wherein the single coil is wound to be twisted at a boundary between the upper motor assembly and the lower motor assembly so that current in an upper portion of the single coil in the upper motor assembly flows in a direction opposite to a direction in which current in a lower portion of the single coil in the lower motor assembly flows, whereby the upper rotor of the upper motor assembly and the lower rotor of the lower motor assembly are rotated in opposite directions to each other,
    wherein slots are formed in the upper stator of the upper motor assembly and the lower stator of the lower motor assembly, and
    wherein each of the slots formed in the upper stator and the lower stator of the upper and lower motor assemblies has a width continuously decreasing toward the boundary between the upper motor assembly and the lower motor assembly.

2. The motor apparatus according to claim 1, wherein the lower motor assembly is aligned to be symmetrical to the upper motor assembly in an axial direction of the upper motor assembly.

3. The motor apparatus according to claim 1,
    wherein the upper rotor is disposed outside the upper stator around which the single coil is wound,
    wherein the upper motor assembly further includes an upper housing which surrounds the upper stator and is coupled to the upper rotor and to which an upper shaft is coupled,
    wherein the lower rotor is disposed outside the lower stator around which the single coil is wound, and
    wherein the lower motor assembly further includes a lower housing which surrounds the lower stator and is coupled to the lower rotor and to which a lower shaft is coupled.

4. The motor apparatus according to claim 3, wherein the slots are formed in the upper stator and the lower stator to be arranged in a circumferential direction of the upper stator and the lower stator so that the single coil is wound along the slots in the upper stator and the lower stator while the single coil is twisted.

5. The motor apparatus according to claim 3, wherein the upper housing and the lower housing are rotatably connected to each other via a bearing portion.

6. The motor apparatus according to claim 1,
    wherein the upper portion of the single coil includes a plurality of first slope portions which intersects each other and then extends therefrom, and a first connection portion connecting upper end portions of the first slope portions to each other, and
    wherein the lower portion of the single coil includes a plurality of second slope portions which is respectively connected to lower end portions of the first slope portions and which intersects each other and then extends therefrom, and a second connection portion connecting lower end portions of the second slope portions to each other.

7. The motor apparatus according to claim 6, wherein the first slope portions and the second slope portions of the single coil extend in opposite directions.

8. The motor apparatus according to claim 7, wherein the first slope portions, the first connection portion, the second slope portions and the second connection portion are in a shape of "8".

9. The motor apparatus according to claim 6, wherein the first slope portions and the second slope portions of the single coil are spaced from each other to prevent contact therebetween.

10. The motor apparatus according to claim 9, wherein the first slope portions and the second slope portions obliquely extend along the slots to cross each other.

11. The motor apparatus according to claim 6, wherein the upper portion and the lower portion of the single coil are twisted at the boundary between the upper motor assembly and the lower motor assembly, and a distance between the pair of first slope portions and a distance between the pair of second slope portions decrease toward the boundary between the upper motor assembly and the lower motor assembly.

\* \* \* \* \*